United States Patent [19]
Curtis

[11] Patent Number: 5,238,558
[45] Date of Patent: Aug. 24, 1993

[54] MAGNETO-HYDRODYNAMIC FLUID TREATMENT SYSTEM

[75] Inventor: Richard F. Curtis, Newport Beach, Calif.

[73] Assignee: Rare Earth Technologies, Newport Beach, Calif.

[21] Appl. No.: 37,142

[22] Filed: Apr. 10, 1992

Related U.S. Application Data

[63] Continuation-in-part of Ser. No. 686,021, Apr. 11, 1991, abandoned.

[51] Int. Cl.$^5$ .................. C02F 1/48; F02M 27/04
[52] U.S. Cl. ..................... 210/222; 123/538; 204/302; 422/186.01; 95/28; 96/1
[58] Field of Search .................. 210/222, 695; 55/100; 123/536, 538; 335/304, 306

[56] References Cited

U.S. PATENT DOCUMENTS

| | | | |
|---|---|---|---|
| 3,168,686 | 2/1965 | King et al. | 335/306 |
| 3,228,878 | 1/1966 | Moody | 210/222 |
| 3,592,428 | 7/1971 | McFarlane | 248/74 |
| 4,265,746 | 5/1981 | Zimmerman, Sr. et al. | 210/695 |
| 4,265,754 | 5/1981 | Menold | 210/222 |
| 4,265,755 | 5/1981 | Zimmerman | 210/222 |
| 5,024,759 | 6/1991 | McGrath et al. | 210/222 |
| 5,037,546 | 8/1991 | Janczak et al. | 210/222 |
| 5,063,368 | 11/1991 | Ettehadieh | 335/301 |
| 5,078,870 | 1/1992 | Carpenter | 210/222 |

FOREIGN PATENT DOCUMENTS 8503649  8/1985  World Int. Prop. O. .

OTHER PUBLICATIONS

Reimers et al., "Reviewing the Use of Non-Ionizing Irradiation Processes (e.g., Magnetic, Electromagnetic, Electrical) in Industrial Water Treatment," *Applied Fields for Energy Conservation, Water Treatment, and Industrial Applications*, Tulane Univ., DOE/CE/405-68—T1, Jun. 1986.

*Primary Examiner*—Matthew O. Savage
*Attorney, Agent, or Firm*—Christie, Parker & Hale

[57] ABSTRACT

The present invention relates to a magneto-hydrodynamic system and method for the treatment of pipes and the fluid carried in the pipes to prevent scaling and build-up of deposits in the pipe. The magneto-hydrodynamic system comprises a pipe for carrying a fluid and at least one magnet unit abutting the exterior of the pipe to be treated. The magnet unit comprises at least four magnets, each having a magnetic-field density of about 6,700 gauss, end pole pieces on each end of the magnet units, and a top pole piece covering the surface of the magnets on a side of the magnets opposite the side in contact with the pipe to be treated.

5 Claims, 4 Drawing Sheets

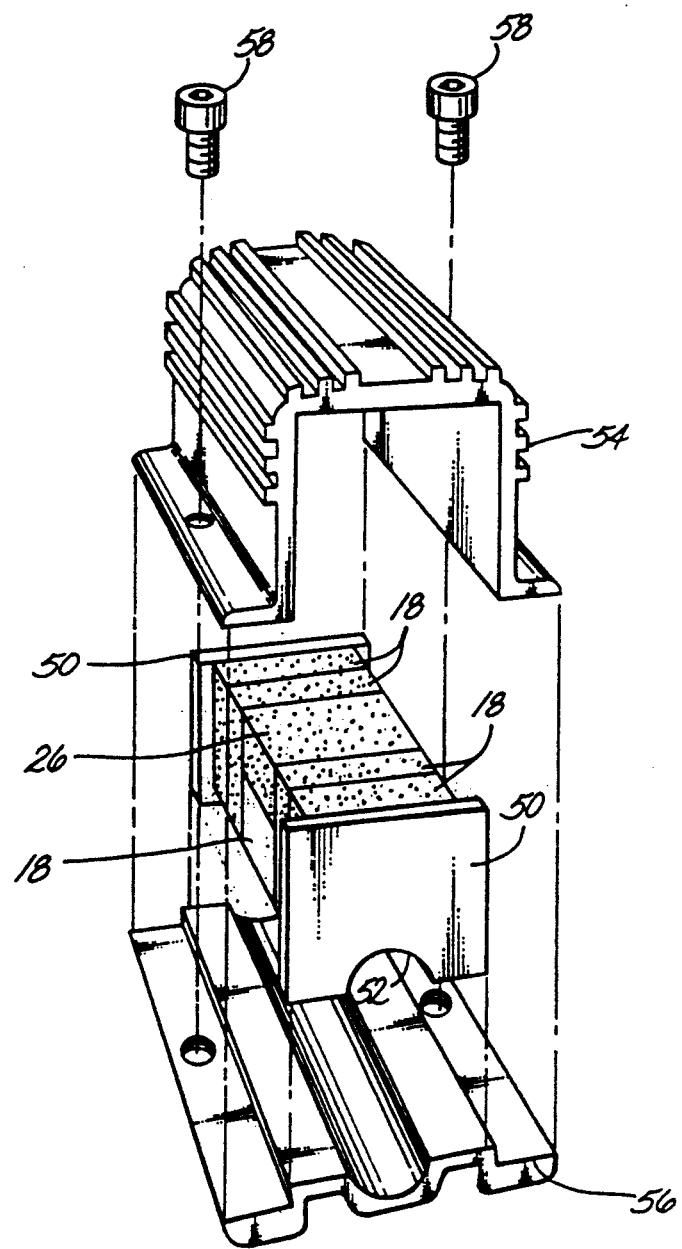

MAGNETO-HYDRODYNAMIC FLUID TREATMENT SYSTEM

CROSS-REFERENCE TO RELATED APPLICATION

This application is a continuation-in-part of application Ser. No. 07/686,021, filed Apr. 11, 1991, now abandoned.

FIELD OF THE INVENTION

This invention relates to the descaling of pipes carrying water, gasoline, or other fluids, and to the "conditioning" of such fluids.

BACKGROUND OF THE INVENTION

Water supplies typically contain chemicals, such as calcium carbonate, which are leached from the ground or from pipes carrying the water and are carried along with the water. Over time, these chemicals are deposited on the interior of the pipes and lead to buildup in the form of scale (e.g., calcite) within the pipes. Eventually, this buildup results in a constriction of the pipes and a reduction of the flow of water through the pipes. Similar materials also deposit on cooling towers, heat exchangers, and boilers, reducing their efficiency, which in turn results in increased operation costs. Material such as iron dissolved in water can be deposited on fountains or other surfaces that are constantly in contact with water, resulting in unsightly stains. In addition, water pools, lakes, fountains, and spas often contain microorganisms which result in poor quality and unattractive water.

Currently, removal of scale and microorganisms is achieved by treatment with chemicals, such as hexavalent chromium, hydrochloric acid, and sodium hypochlorite. Treatment with such chemicals results in a considerable cost for the continued use of the chemicals themselves and the constant monitoring which is required to ensure that the chemicals are at the correct "working" concentrations. The use of such chemicals may lead to increased rates of corrosion of the pipes and of other structures which are subjected to them. In addition, while treatment of scale on pipes with chemicals may lead to an increased water flow by enlarging the effective internal diameter of the pipes, the scale is not removed completely, and significant amounts of scale remain in place.

An additional cost of the use of chemicals is to the environment. Chemicals that are used in treating the water cause contamination of the water, and such water may require collection and dumping after use. Such dumping results in a significant economic, as well as environmental, cost.

Another source of environmental pollution is the inefficient burning of gasoline in internal combustion engines, where unburned gasoline is exhausted into the environment. Also, inefficient burning of gasoline in an internal combustion engine results in a buildup on spark plugs, which necessitates frequent tune-up of engines in order to maintain their operation at a reasonable level of efficiency.

Over the last fifty years, non-ionizing irradiation processes, such as magnetic fields, have been advertised as a kind of panacea for water treatment. It has been claimed that these devices require no technical training or control and will treat water non-chemically to control microorganism growth, prevent scale, and inhibit corrosion. Variable effectiveness and little scientific understanding of the process mechanisms have produced substantial skepticism.

Since the 1950's, many magnetic water-conditioning devices have claimed to require no addition of chemicals for scale and corrosion control. However, by the late 1950's, reports indicated that systems in operation were not effective in reducing scale and corrosion and suggested that the ineffectiveness was due to low field intensity. Skepticism continued, and by the 1970's, reports implied that these systems were contrary to the basic principles of science and were inoperative. Similar reports have cautioned against the use of these systems for industrial treatment.

Numerous studies on descaling, softening, and corrosion control have not observed any positive results, although some studies have reported the effectiveness of magnetic treatment processes. These studies have noted many problems, which can be divided into two categories:

1) operational and maintenance problems: One study found that, when boiler water was treated by a magnetic applied field process, large pieces of scale dropped from the upper tube and tank wall surface and accumulated on the tubes below. This scale resulted in "hot spots," requiring tube replacement and expensive downtime. Consequently, frequent inspection and removal of scale deposits were suggested. Accumulation of scale in the bottom of the boiler was also observed as cleaning progressed. Such accumulations can clog blowdown openings and cause a buildup in soluble salt concentrations, which could result in further scaling; and 2) process reliability: Magnetic systems have been reported to have problems with the influence of external magnetic fields, temperature, vibration, and masses of metals.

In view of the above, there is a need for a system which will prevent and remove scale buildup, inhibit the growth of microorganisms, and prevent staining from compounds contained in water. In addition, there is a need for a system which will aid in the complete combustion of gasoline in an internal combustion engine. The system should be a low-cost system that is non-polluting.

Furthermore, since pipes come in all sizes, it is desirable that such a system be adaptable to accommodate any conventional pipe size which may be encountered in the routine use of such a device.

SUMMARY OF THE INVENTION

The present invention relates to a magneto-hydrodynamic system, and method, for the treatment of pipes, and the fluid carried in the pipes, to prevent scaling and build-up of deposits in the pipe.

The magneto-hydrodynamic system comprises a pipe for carrying a fluid, at least one magnet unit abutting the exterior of the pipe and means of securing the magnet unit to the pipe. Additional units may be added to accommodate large diameter pipes.

The magnet unit comprises at least four magnets, each having a magnetic-field density about 6,700 gauss. End pole pieces are placed on each end of the magnet units, and a top pole piece covers the surface of the magnets on the sides of the magnets opposite the side in contact with the pipe to be treated.

BRIEF DESCRIPTION OF THE DRAWINGS

Features, aspects, and advantages of the present invention will be more fully understood when considered with respect to the following detailed description, appended claims, and accompanying drawings, where:

FIG. 5 is an exploded view of a magnet unit and housing for use on fuel lines.

DETAILED DESCRIPTION

Figure 1:
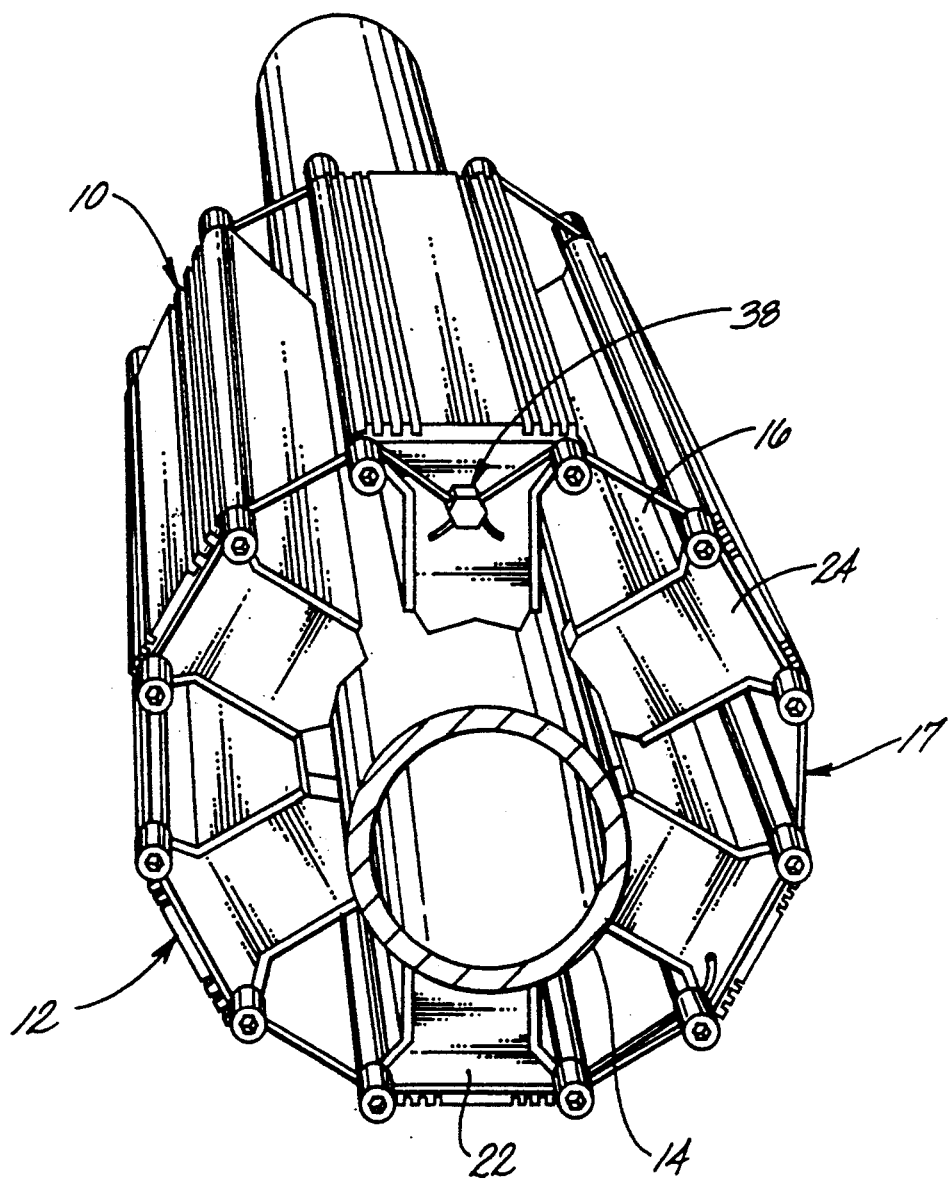
FIG. 1 is a semi-schematic perspective view of a magneto-hydrodynamic system.

FIG. 1 illustrates a magneto-hydrodynamic treatment system 10. The system in one embodiment includes six magnet units 12, which abut a pipe 14 that is to be treated. Each magnet unit is held together by a housing 6. The magnet units are joined to each other and held in position around the pipe by a wire 17. In one embodiment, the magnet unit has dimensions of about 10 cm long, about 2 cm wide, and about 3 cm deep.

Figure 2:
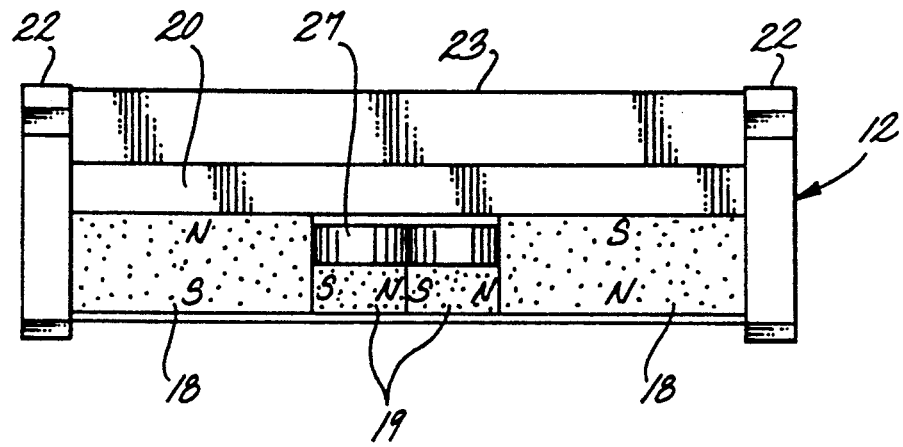
FIG. 2 is a semi-schematic front elevation of a magnet unit with the housing removed.
Figure 3:
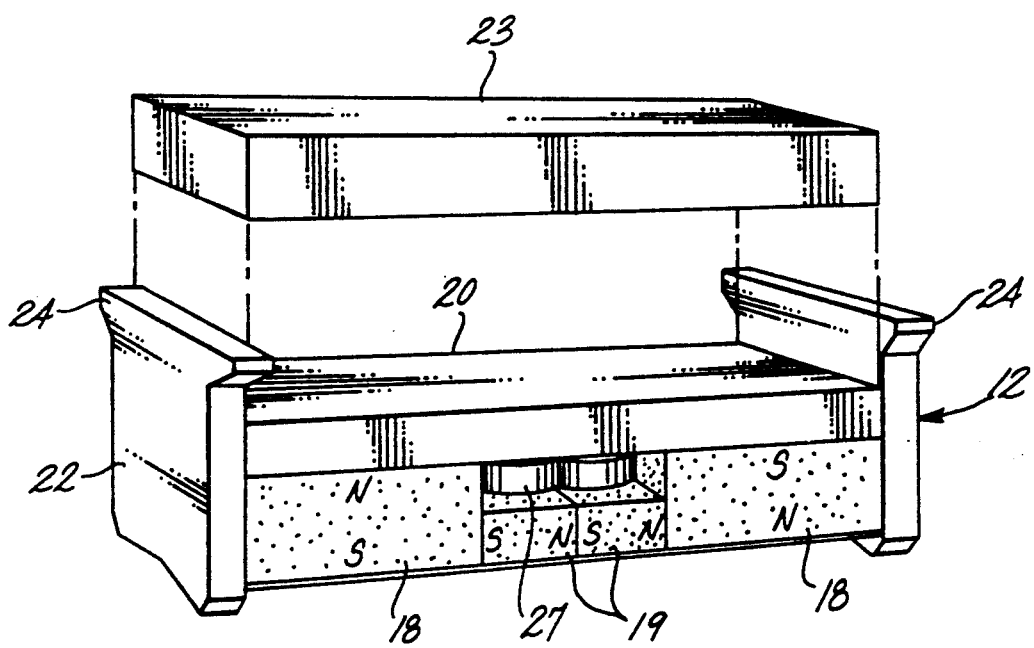
FIG. 3 is a semi-schematic perspective view of the magnet unit shown in FIG. 2, except the top pole plate has been removed.

Each magnet unit, shown in FIGS. 2 and 3, includes a plurality of permanent magnets 18 and 19. The magnets are rare-earth cobalt magnets and/or iron/boron magnets. A suitable magnet for use in the present invention are CRUMAX ® and/or CRUCORE ®, supplied by All Magnetics, Inc. of Placentia, Calif.

The magnets are arranged so that a like pole of each of the magnets is adjacent a like pole of an adjacent magnet. End pole pieces 22 are placed at either end of the magnet unit, and a top pole piece 20 is placed between the end pole pieces and along the length of the magnet unit. It is thought that the top and the end pole pieces act to "focus" the magnetic field into the pipe to be treated.

In a six-magnet-containing unit, as shown in FIGS. 2 and 3, the arrangement of the components is, starting at the downstream side of the magnet unit: an end pole piece; a large magnet 18, the south pole of which abuts the pipe and the north pole of which abuts the top pole piece; two small magnets 19, both of which are oriented with their respective non-polar surfaces abutting the pipe and with the south pole of each of the magnets oriented to be downstream and the north pole of each of the magnets upstream; a second large magnet, the north pole of which abuts the pipe and the south pole of which abuts the top pole piece; and a second end pole piece at the end of the magnet unit. The space created between the small magnets and the top pole piece is filled with two cylindrical magnets 27. The cylindrical magnets are oriented so that their poles are oriented in the same direction as the large magnets adjacent them. Alternatively, the space between the small magnets and the top pole piece may be filled with a filler. Above the top pole piece is a filler 23, which fills the space between the top pole piece and the housing and which ensures that the magnets remain in contact with the pipe.

In one embodiment of the present invention, the magnets have a magnetic-field density of at least 6,700 gauss per magnet. It is desirable to use magnets with such a magnetic-field density so that the "descaling," for example, of a clogged pipe occurs over a time period of from about 90 to about 120 days or longer. If the descaling process occurs over a very short period of time, it is possible that clumps of scale will break free and clog the pipe downstream, resulting in damage to the pipe and disruption of the water supply. If the descaling process is performed relatively slowly, the scale is gradually released into the water flowing through the pipe and is carried away and out of the pipe. While a period of from 90 to 120 days is often sufficient to descale pipes, in some cases the scale buildup is so extensive that prolonged exposure is required. This prolonged exposure is in the order of from several months to one year. The magneto-hydrodynamic treatment system is effective for use with pipes constructed from materials such as galvanized steel, black iron, PVC, copper and glass.

Figure 4:
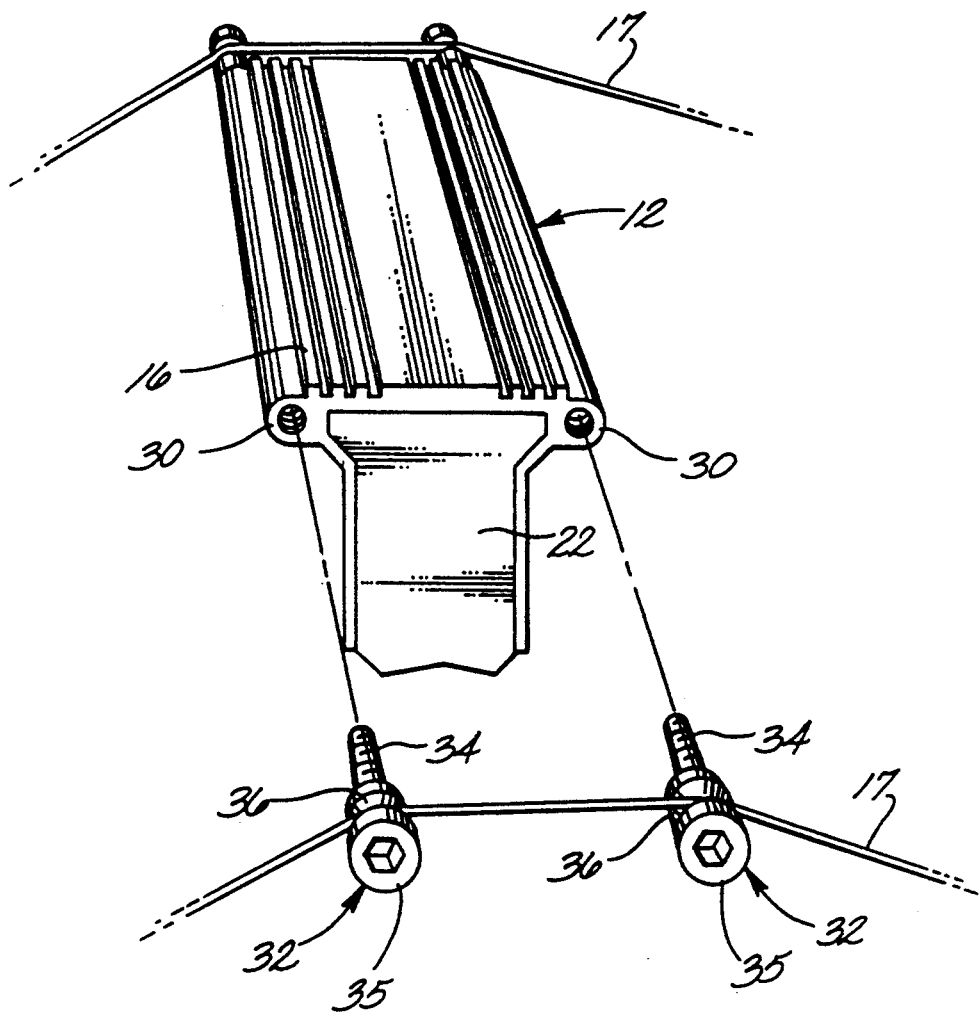
FIG. 4 is a semi-schematic perspective view of two magnet units placed on a pipe.

In another embodiment of the present invention, each magnet has a rectangular cross-section. The end pole pieces also have a generally-rectangular cross-section, but have a flanged top 24 with a greater width than that of the principal cross-section. The flanged top connects into the housing 16, as shown in FIG. 4. The bottom of each pole piece is angled upward to form a concave section at its center, allowing the magnet units to conform to the shape of the pipe which they are to treat. The top pole piece comprises a flat strip, which extends from one end pole piece to the other end pole piece. In one embodiment, the end and top pole pieces are composed of powdered, pressed metal produced by a powder metallurgy process. Metals suitable for use as pole pieces in the present invention include ferromagnetic metals. Such metals can be obtained from Compax, Inc., of Anaheim, Calif. Each pole piece is preferably coated with TEFLON or other suitable coating to prevent corrosion.

The magnet unit, once assembled, is then placed in an aluminum housing. The housing has a roughly-rectangular, U-shaped cross-section and comprises an inset to slidably engage the flanged tops of the end plates. The housing is enclosed on three sides and open on the side which abuts the pipe. Molded into the housing, at the end of the base of the "U" and at each end of the housing, are holes 30 for receiving wire rests 32.

In a preferred embodiment, the wire rests comprise a pin 34 at one end to engage the holes of the housing, with a cylindrical head 35 at the other end. A groove 36 is cut around the circumference of the head to engage a wire 17. When the wire rests are placed in the holes of the housing, the cylindrical head overlaps the pole plate, thereby holding the pole plate and the magnets in place.

In operation, the magneto-hydrodynamic treatment system includes a plurality of magnet units, each disposed around the pipe to be treated. Each of the magnet units is held in position by a wire which slidably connects to each side of a housing of the magnet unit. The wires therefore form a perimeter around the pipe and the magnet units. The magneto-hydrodynamic treatment system, comprising magnet units each of about 10 cm in length by about 2 cm in width and about 3 cm in height, is effective on all pipe sizes from about 1 cm up to about 60 cm. Any pipe size larger than about 60 cm would require the use of magnet units of greater dimensions.

The number of magnet units used in the magneto-hydrodynamic treatment system of the present invention is determined by the diameter of the pipe. For example, a magneto-hydrodynamic treatment system for use on pipes with a diameter of from about 1 cm to about 2.5 cm includes two magnet units. The number of magnets desirable for different-diameter pipes is set forth in Table 1.

TABLE 1

| Pipe Diameter (in cm) | Number of Magnets |
|---|---|
| 1-2.5 | 2 |
| 4 | 3 |
| 5 | 4 |
| 6.5 | 5 |
| 8 | 6 |
| 10 | 8 |
| 12.5 | 10 |
| 15 | 12 |
| 18 | 14 |
| 20 | 16 |
| 23 | 20 |
| 30 | 24 |
| 35 | 28 |
| 40 | 32 |
| 45 | 36 |
| 50 | 40 |
| 55 | 44 |
| 60 | 48 |

To assemble the required number of magnet units for the size of pipe to be treated, magnet units are placed around a pipe to be treated, and the units are secured in place with a bolt 38. The loose ends of the wire are wound around the bolt so that, when it is turned, the wire tightens and thus tightens the magnet units to the pipe. The magneto-hydrodynamic treatment system of the present invention can be varied to fit any desired pipe size, by minor adaptation procedures and at a relatively small cost. Such modification can be readily performed on site.

The present invention is described above in relation to one general working embodiment for use in descaling water pipes and is for illustration purposes. Variations will be apparent to those skilled in the art. For example, the pipe being treated may be grounded on the upstream side from the magneto-hydrodynamic treatment system. Such grounding enhances the descaling process. Multiple treatment systems can be used on a single pipe system to remove scale along its entire length or, alternatively, a single treatment system can be moved along the length of a pipe after one clogged region is cleared. For use in cooling towers, multiple treatment systems are used. In a typical cooling-tower installation, treatment systems are positioned on the return and make-up water lines, as well as on water lines which go to the chiller or the heat exchanger. Such a configuration results in descaling of the cooling tower being treated.

Additionally, the magneto-hydrodynamic treatment system can be used on the inlet pipes of recirculation water lines for ponds and lakes. The use of the magneto-treatment system results in an increased clarity of the water in the pond or the lake, due to a reduction in the number of microorganisms present in the water. The magneto-hydrodynamic treatment system can be used on the water inlet pipes of fountains. Such use prevents the buildup of rust stains and also aids in the removal of existing rust stains. In addition, permanent magnets other than rare-earth cobalt magnets could be used to achieve the desired results. Electro-magnets could be used in place of permanent magnets.

In another embodiment of the present invention, the magneto-hydrodynamic treatment system is used on very small pipes such as piping for ice makers or for fuel lines in an internal combustion engine to increase the efficiency with which fuel is burned, hence reducing the hydrocarbon emissions and buildup on engine components such as spark plugs. In one embodiment (see FIG. 5), the magnet unit for use on such fuel lines includes five permanent magnets 18. The magnetic-field densities of the rare-earth cobalt magnets are at least 6,700 gauss per magnet. The arrangement of the components in this embodiment is, starting at the downstream side of the magnet unit: an end pole piece; a first magnet, the north pole of which abuts the pipe and the south pole of which abuts the top pole piece; a second magnet, the north pole of which abuts the pipe and the south pole of which abuts the top pole piece; a third magnet, turned on its side relative to the first and second magnets so that its non-polar surface abuts the pipe (the space so created between the magnet and the top pole piece is filled with a spacer 26); a fourth magnet, the south pole of which abuts the pipe and the north pole of which abuts the top pole piece; a fifth magnet, the south of pole of which abuts the pipe and the north pole of which abuts the top pole piece; and a second end pole piece at the end of the magnet unit. In this embodiment of the invention, the dimensions of the magnet unit are about 3.1 cm in length, about 2.2 cm in width, and about 1.5 cm in height. The pole pieces 50 and magnets have a generally-rectangular cross-section. A semicircular groove 52 is cut into one side of the pole piece and the magnets to accommodate the fuel line being treated. Only a single magnet unit need be used for effective treatment of small-diameter pipes. The magnet unit is attached to the fuel line by a housing 54 and attachment plate 56. Screws 58 secure the housing to the attachment plate and hence to the fuel line. The housing is constructed of material such as aluminum or other suitable material. In operation, the magnet unit is located close to the carburetor or fuel-injection system. However, contact of the magnet unit with computer systems located in, or used in conjunction with, the internal combustion engine should be avoided, since damage to the computer may result.

The present invention is described above in relation to a second general working embodiment for use on fuel lines and is for illustration purposes. Variations will be apparent to those skilled in the art. For example, the magneto-hydrodynamic treatment could have larger or smaller dimensions than those recited for use with different-size fuel lines. Multiple magnet units could be used on large-diameter fuel lines. The magnet unit could include more individual magnets. The magnet unit could be attached to the fuel line or to the pipe to be treated by other suitable attachment means. Therefore, the present invention is not intended to be limited to the working embodiments described above. The scope of the invention is defined in the following claims.

What is claimed is:

1. A magneto-hydrodynamic treatment system comprising:
   a pipe for carrying a fluid;
   at least one magnet unit abutting the exterior of the pipe; 'the magnet unit including a first magnet positioned to have its south pole abutting the pipe, said first magnet having a non-polar surface abutting a south pole of a first intermediate magnet;
   the magnet unit including a second magnet positioned to have its north pole abutting the pipe, said second magnet having a non-polar surface abutting a north pole of a second intermediate magnet;

said two intermediate magnets each positioned to have non-polar surfaces abutting the pipe, wherein the intermediate magnets are arranged end to end between the first and second magnets with the north pole of the first intermediate magnet abutting the south pole of the second intermediate magnet;

each magnet having a magnetic-field density of about 6,700 gauss;

an end pole piece on each opposed end of the magnetic unit, one end pole piece abutting a non-polar surface of the first magnet at one end of the magnet unit and the other end pole piece abutting a non-polar surface of the second magnet at the other end of the magnetic unit; and a top pole piece extending between the end pole pieces and covering an outer surface of the magnets on a surface of the magnets opposite a surface in contact with the pipe; and means for securing the magnet unit to the pipe.

2. A system as claimed in claim 1, wherein the means of securing the magnet units to the pipe comprises:

wire rests attached to each of the magnet units; 'wire looped through the wire rests of each of the magnet units; and a locking and tightening means for tightening the wire around the wire rests to thereby attach the magnet units to the pipe.

3. A system as claimed in claim 1, wherein the magnet unit is enclosed in a housing.

4. A system as claimed in claim 1, wherein the end pole pieces comprise ferromagnetic metals.

5. A system as claimed in claim 1, wherein the top pole piece comprises a ferromagnetic metal.

* * * * *

UNITED STATES PATENT AND TRADEMARK OFFICE
CERTIFICATE OF CORRECTION

PATENT NO. : 5,238,558
DATED : August 24, 1993
INVENTOR(S) : Richard F. Curtis

It is certified that error appears in the above-indentified patent and that said Letters Patent is hereby corrected as shown below:

On the title page:

[21] Appl. No.: change "37,142" to -- 867,142 --.

Column 3, line 24, change "6" to -- 16 --.
Column 6, line 20, after "south" delete "of".

Column 6, Line 61, change "`the magnet" to
          -- the magnet --.
Column 8, Line 6, change "`wire" to -- wire --.
Column 8, line 9, before "means" delete "a locking and
          tightening".

Signed and Sealed this

Twenty-sixth Day of April, 1994

Attest:

BRUCE LEHMAN

Attesting Officer

Commissioner of Patents and Trademarks